July 26, 1955 T. N. ADLAM 2,714,142
RADIANT RAY AND CONVECTION RESPONSIVE THERMOSTAT
Filed Nov. 19, 1951 4 Sheets-Sheet 1

INVENTOR.
THOMAS NAPIER ADLAM
BY
Clark & Ott
ATTORNEYS

July 26, 1955

T. N. ADLAM 2,714,142

RADIANT RAY AND CONVECTION RESPONSIVE THERMOSTAT

Filed Nov. 19, 1951

INVENTOR.
THOMAS NAPIER ADLAM
BY
Clark & Ott
ATTORNEYS

July 26, 1955 T. N. ADLAM 2,714,142
RADIANT RAY AND CONVECTION RESPONSIVE THERMOSTAT
Filed Nov. 19, 1951 4 Sheets-Sheet 3

INVENTOR.
THOMAS NAPIER ADLAM
BY
Clark & Ott
ATTORNEYS 2,714,142
Patented July 26, 1955

2,714,142
RADIANT RAY AND CONVECTION RESPONSIVE THERMOSTAT

Thomas Napier Adlam, West Orange, N. J., assignor to Sarcotherm Controls, Inc., New York, N. Y., a corporation of Illinois Application November 19, 1951, Serial No. 257,120

7 Claims. (Cl. 200—122)

This invention relates to a thermostat for controlling the flow of fluid for heating the interior of a closure.

An object of the invention is to provide a thermostat which is responsive to the combined conditions in a closure which influence the feeling of warmth and cold, such as the temperature of the atmosphere therein and the radiant heating effect of the walls and surfaces of the closure. In order to provide for these conditions the present invention comprehends a thermostat which includes a casing having a thermostatic element and a heater located therein for producing a heated condition within the casing which is increased or lessened by conduction or convection to or from the atmosphere surrounding the casing. In adition thereto, the casing is of parabolic formation and is provided with a blackened outer surface for absorbing the radiant heating effect of the walls and surfaces of the closure which are focused by the parabolic formation upon the thermostatic element.

Another object of the invention is to provide a thermostat of said character having a switch element located within the casing of the thermostat which is electrically connected with a heating element of a thermostatically controlled mixing valve and which is controlled by the thermostat for proportioning the flow of hot and cold water to the mixing chamber of said valve.

Still another object of the invention is to provide a thermostat in which the thermostatic element is enclosed within a metallic shell whereby the temperature therein remains substantially constant unless affected by the temperature conditions on the outside of the shell.

With the foregoing and other objects in view, reference is now made to the following specification and accompanying drawings in which the preferred embodiment of the invention is illustrated.

Figure 1:
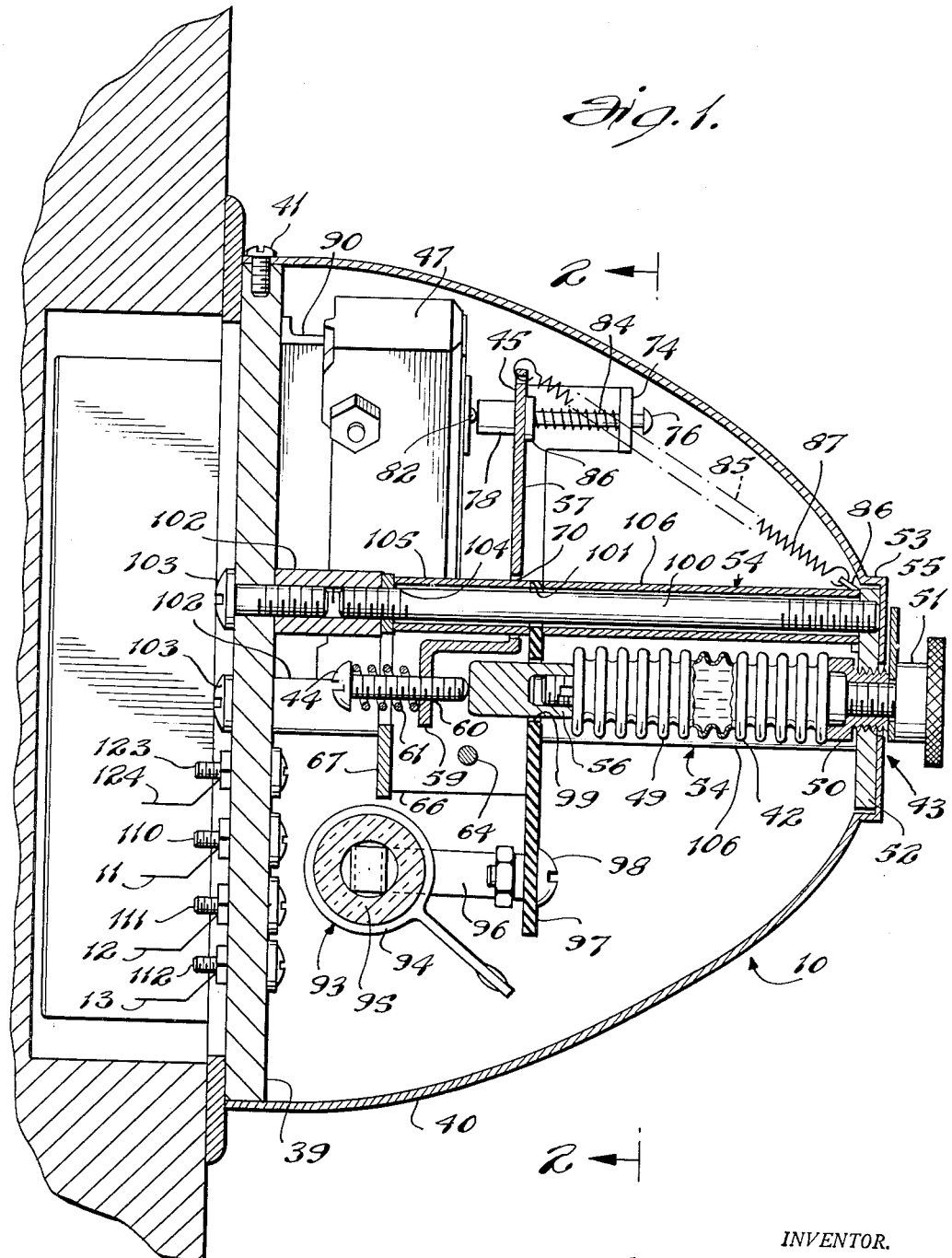
Fig. 1 is a sectional view of a thermostat constructed in accordance with the invention.
Figure 2:
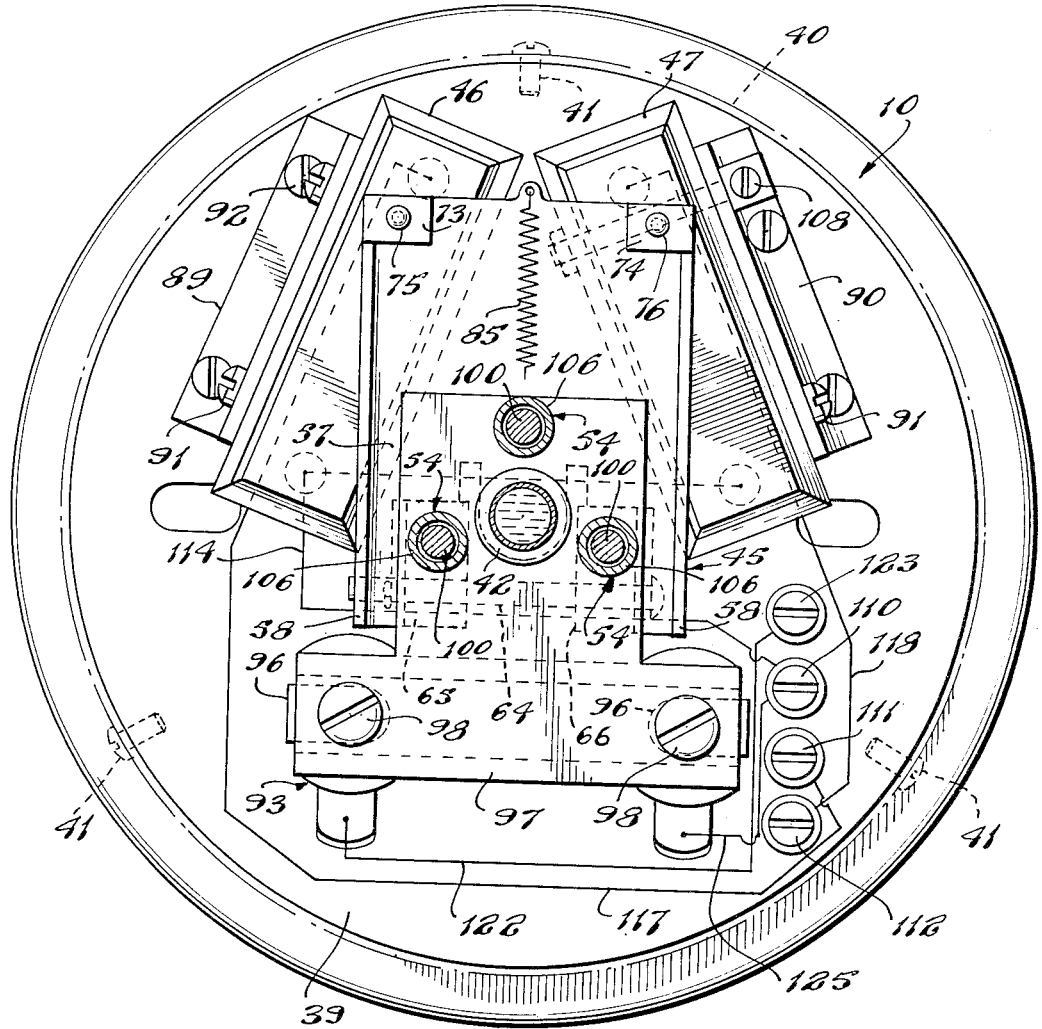
Fig. 2 is a sectional view taken approximately on line 2—2 of Fig. 1 with the metallic shell removed.
Figure 5:
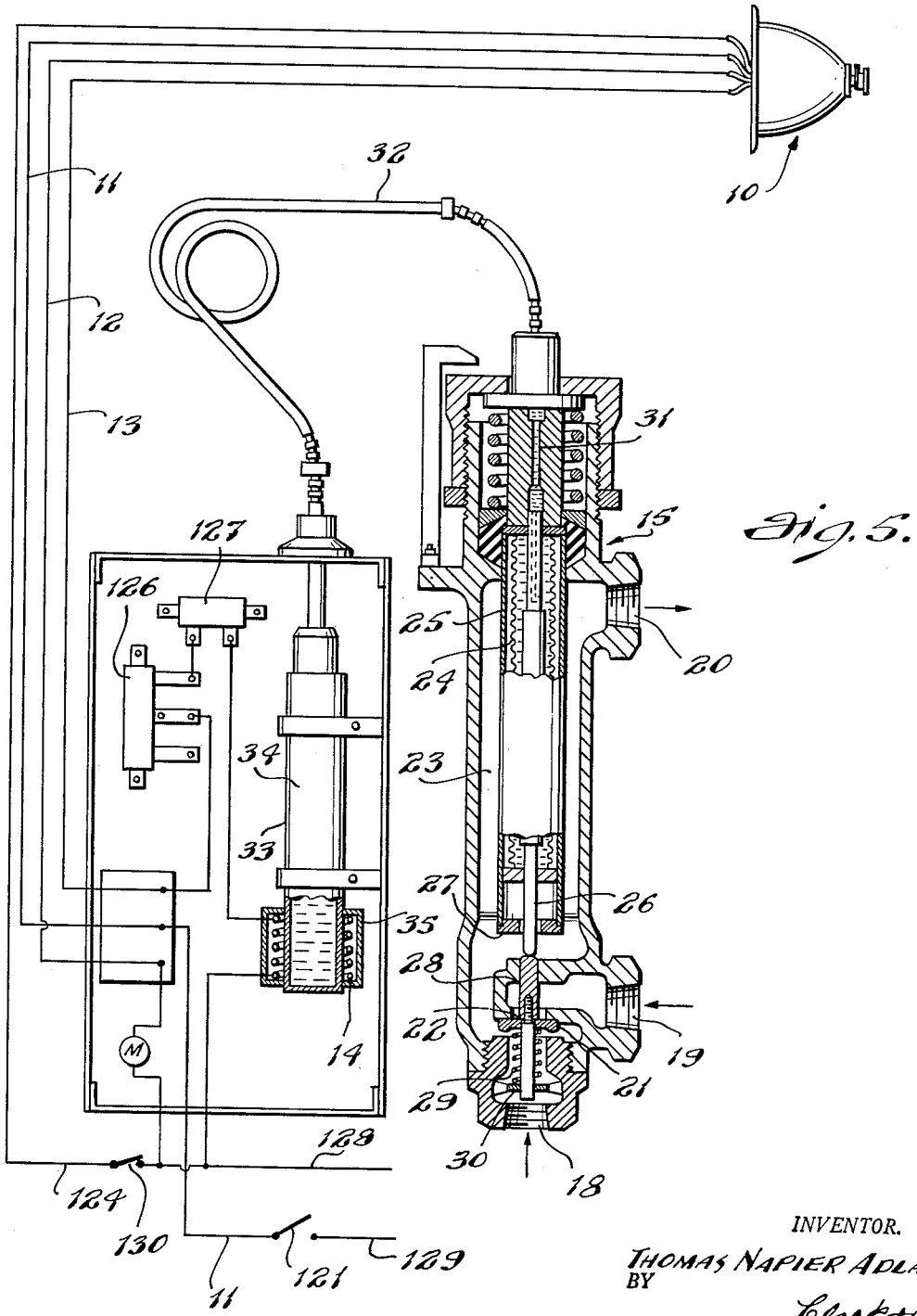
Fig. 5 is a view in elevation of a thermostatically controlled valve together with the wiring connections from the thermostat to the heating element thereof.

Referring to the drawings by characters of reference, the thermostat indicated generally by the reference character 10 is so constructed and arranged as to be responsive to the combined influence of the several factors or conditions which influence the feeling of warmth and cold such as the temperature of the atmosphere as well as the radiant heating effect of the walls and surfaces on the thermostat as shown in Figs. 1 and 2 of the drawings. For this purpose, the thermostat includes one or more switches, two being shown in the present embodiment, one of which is connected by conductor wires 11 and 12 with the motor M of a motor driven circulating pump (not shown) for circulating blended water from a thermostatically controlled mixing valve 15 shown in Fig. 5 of the drawings to a heat exchange means (not shown) for heating a closure, while the other switch is connected on one side by the conductor wire 11 and on the other side by a conductor wire 13 with a heating element 14 of the thermostatically controlled valve for proportioning the flow of hot and cold water through the mixing chamber of said valve.

The valve 15 includes a valve body having a hot water inlet 18, a cold water inlet 19 and a blended water outlet 20 with a valve element 21 arranged to control the flow of hot and cold water through a valve port 22 for mixing the same in the chamber 23 before discharge of the water through the blended outlet 20. The outlet 20 is connected by suitable piping with the pump driven by the motor M and with the heat exchange means in the closure for heating the same in accordance with the requirements controlled by the thermostat 10. The valve element 21 is actuated by movement of an expansible and contractible corrugated bellows 24 located in a fixed casing 25 extending longitudinally of the chamber 23. A plunger 26 is affixed to and is movable with the bellows and has its lower end protruding through the end wall 27 of the casing into engagement with the valve stem 28. A spring 29 is interposed between the valve element 21 and a fixed spider 30 for normally maintaining the valve element 21 in closed relation on the port 22. The expansible and contractible bellows 24 is in communication through the duct 31 in the upper end of the valve with a flexible conduit 32 connected at its outer end with a thermostatic bulb 33. A thermal fluid fills the bellows 24 as well as the casing 34 of the bulb 33 and the duct 31 and flexible tube 32. The thermal fluid in the bulb 33 is adapted to be heated by the heating element 14 consisting of a resistor coil located within the casing 35 at one end of the bulb.

Figure 6:
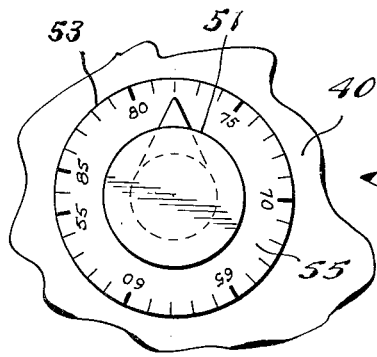
Fig. 6 is a fragmentary view of the outer portion of the metallic shell showing the dial and adjusting knob.

The thermostat 10 includes a casing consisting of a base 39 and a metallic shell 40 of parabolic formation in section with the open end of the shell secured to the base by circumferentially spaced screws 41 for closing the open end thereof. The shell 40 is preferably of copper and is blackened on the outer face thereof for absorbing the radiant rays given off by the walls and surfaces of the closure. Located within the thermostat 10 is a thermostatic element 42 which is arranged concentric with the axis of the shell and extends longitudinally thereof through the focal point of the parabolic formation of the shell. The thermostatic element 42 is disposed between an adjusting head 43 and an adjustable locking screw 44 adjustably mounted on a lever 45 for effecting rocking movement of the lever for actuating the aforesaid switches such as the micro-switches 46 and 47 in circuit with the conduits 11, 12 and 13 for making and breaking the circuit with the heating element 14 and with the motor M of the circulating pump in accordance with the requirements of the closure. The thermostatic element 42 includes an expansible and contractible corrugated bellows 49 having a cap 50 at its outer end which is affixed to an adjusting knob 51 of the adjusting head 43. The cap 50 is threadedly engaged in a circular plate 52 disposed against the outer cylindrical portion 53 of the shell 40 and supported by columns 54 rigidly attached to the base 39. The thermostatic element 42 may thus be adjusted longitudinally of the axis of the shell 40 toward and away from the clamping screws 44 by turning of the knob 51. The outer face of the cylindrical portion 53 of the shell 40 is provided with a graduated dial 55 as shown in Fig. 6 of the drawings for indicating the setting of the thermostatic element 42 and when the same is initially set the screw 44 is tightened against the inner end 56 thereof to provide an abutment against which the expansive action of the thermostatic element is exerted.

Figure 3:
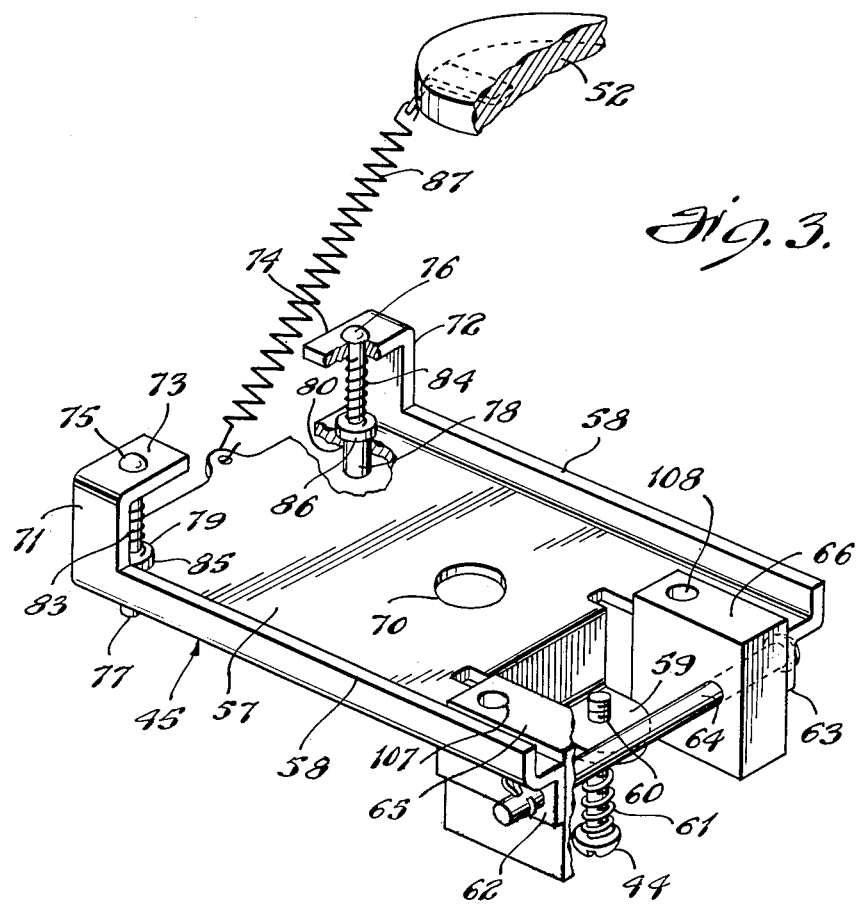
Fig. 3 is a perspective view of the lever assembly interposed between the thermostatic element and electrical switch means of the thermostat.

The lever 45 shown in detail in Fig. 3 includes a plate 57 located substantially parallel with the base 39 and having longitudinally extending side flanges 58. The plate 57 is cut away at one end to form a stepped portion 59 which is provided with a threaded aperture 60 for adjustably receiving the clamping screw 44 and which is tensioned by a coil spring 61 interposed between the head of the screw 44 and the stepped portion 59 for securing the screw in set position. At each side of the stepped portion 59 the plate 57 is formed with apertured parallel flanges 62 and 63 through which a pivot pin 64 extends for pivotally mounting the lever 45 on spaced parallel blocks 65 and 66 rigidly affixed to a plate 67 supported by the columns 54. At the free outer end of the lever 45 the end portions 71 and 72 of the side flanges 58 extend outwardly therebeyond with the outer ends of said end portions provided with inwardly directed extremities 73 and 74 respectively which are apertured to freely receive the outer ends of plungers 75 and 76. The said plungers have enlarged inner ends 77 and 78 which slidably extend through openings 79 and 80 in the plate 57 thereof for engagement with switch buttons 81 and 82 of the micro-switches 46 and 47 respectively for actuating the same with the movement of the lever 45. The plungers 75 and 76 are maintained in resilient engagement against the switch buttons 81 and 82 respectively by coil springs 83 and 84 respectively which are interposed between the extremities 73 and 74 and the lower ends 77 and 78 of the plungers. The plungers are formed with flanges 85 and 86 adapted to engage against the plate 57 of said lever for limiting the movement of the plungers. In the event of excessive heating of the thermostatic element 42 to swing the lever 45 a greater distance than contemplated for the actuation of the micro-switches, the springs 83 and 84 function to permit of outward movement of the plungers in the openings 79 and 80 so as to prevent rupture of the micro-switches. A coil spring 87 is attached at one end to the outer free end of the lever 45 with the opposite end of the spring affixed to the circular plate 52. The said spring functions to tension the lever for movement thereof to release the switch buttons 81 and 82 with the contraction of the bellows 49.

The micro-switches are supported on the base 39 by means of angle brackets 89 and 90 which are affixed to the micro-switches by screws 91 and to the base 39 by screws 92 to thereby dispose the micro-switches in parallel spaced relation with reference to the base and in angular relation with reference to the lever 45 so as to dispose the switch buttons 81 and 82 thereof in axial alignment with the plungers 75 and 76 respectively.

In order to maintain a heated condition within the thermostat 10, a heating element 93 consisting of a resistor coil 94 shown in Figs. 1 and 2 of the drawings is arranged therein which is in circuit with the source of current supply. The resistor coil 94 is wound on an insulation block 95 and is supported in spaced relation from the walls of the thermostat 10 and the parts therein by brackets 96 affixed to an insulation plate 97 by screws 98. The insulation plate 97 extends laterally into overlying relation on the blocks 65 and 66 and is apertured as at 99 to freely receive therethrough the inner end 56 of the thermostatic element 42.

The three columns 54 arranged in triangular formation as shown in Fig. 1 of the drawings support the thermostatic element 42 together with the plates 67 and 97 and the blocks 65 and 66 disposed between said plates and on which blocks the lever 45 is pivotally supported. The columns 54 each include a bar 100, which bars are threadedly secured at their upper ends in openings in the circular plate 52 and are threadedly secured at their lower ends in interiorly threaded sleeves 102. Studs 103 projecting through the base 39 are threadedly secured in the lower ends of the sleeves 102 to thereby rigidly attach the columns to the base with the circular plate 52 affixed to the outer ends thereof. The bars 100 protrude through openings 101 in the insulation plate 97 and through openings 104 in the supporting plate 67 and extend through sleeves 106 arranged between and in abutting engagement with the circular plate 52 and the insulation plate 97. The forwardly disposed bar 100 also extends through a sleeve 105 located between and disposed in abutting engagement with the plates 67 and 97. The two rearmost bars 100 extend through openings 107 and 108 in the blocks 62 and 63 respectively. The plates 67, 97 and 52 are thereby secured in spaced parallel relation on the columns 54 with the blocks 65 and 66 secured thereon in position between the plates 67 and 97.

Figure 4:
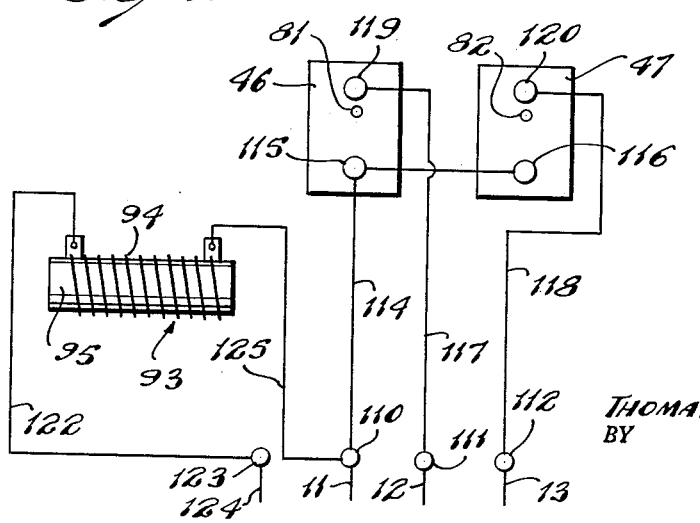
Fig. 4 is a plan of the wiring diagram.

As shown in Fig. 4 of the drawings, the conductor wires 11, 12 and 13 are respectively connected with posts 110, 111 and 112 carried by the base 39. A conductor wire 114 connects the post 110 with the terminals 115 and 116 of the micro-switches 46 and 47 respectively, while the conductor wires 117 and 118 connect the posts 111 and 112 with the terminals 119 and 120 of said switches respectively. The heating element 93 is connected on one side by a conductor wire 122 with a post 123 and on the other side by a conductor wire 125 with the post 110. Connected in this manner the micro-switch 47 is in circuit through the conductor wires 11 and 13 with the heating element 14 and with a variable resistor 126 and a fixed resistor 127 interposed in the conductor line 13 and which line connects with a conductor wire 128 leading to one side of the source of current supply. The micro-switch 46 is in circuit through the conductor wires 11 and 12 with the motor M of the motor driven circulating pump, the conductor wire 12 being connected with the conductor wire 128 leading to one side of the source of current supply while the conductor wire 11 being a common conductor for the micro-switches 46 and 47 and is connected to a conductor wire 129 leading to the other side of the source of current supply. The heating element 93 is in circuit through the conductor wires 124 and 11 with the conductor wires 128 and 129 leading to the source of current supply. A master switch 121 is interposed in the conductor line 129 for connecting the aforesaid switches and the heating element 93 with the source of current supply, while a switch 130 is interposed in the conductor line 124 for independently disconnecting the heating element 93 from the source of current supply.

It will be understood that the micro-switches 46 and 47 may be set to be actuated successively by any desired temperature difference in the closure to be heated. Thus if the thermostat 10 is in operation and if the temperature on the closure in which the thermostat is located rises above a predetermined temperature set by the control knob 51, the micro-switch 47 which is a normally open switch will be actuated by the thermostatic element 42 by movement of the lever 45 to close the circuit with the heating element 14 thereby moving the valve element 21 of the valve 15 to proportion a greater flow of the cold water into the mixing chamber 23. The temperature of the circulating medium for heating the closure will thus be decreased. In the event that the temperature of the closure continues to rise, the thermostatic element 42 will depress the lever 45 so as to actuate the micro-switch 46 which is a normally closed switch to thereby break the connection with the motor M of the motor driven pump which will thereupon cease to pump the circulating medium to the closure. When there is a sufficient drop in the temperature conditions in the closure so as to affect the thermostatic element 42, the micro-switch 46 will be actuated to place the motor M of the motor driven pump into operation to start the circulation of the circulating medium, and a further drop in temperature in the closure will affect the thermostatic element 42 to actuate the micro-switch 47 to break the connection with the heating element 14 whereby a greater proportion of hot water will be admitted to the mixing chamber 23.

The heating element 93 maintains a heated condition within the casing of the thermostat of approximately 80 to 82° which renders the thermostat sensitive to outside temperature conditions acting thereon. The thermostat may operate without the use of the heating element 93 by disconnecting the switch 130 which will not affect the operation of the thermostat since the temperature within the casing is only affected by the dissipation of heat through the casing or by an increase of heat transmitted through the casing.

The micro-switches 46 and 47 may be arranged in any other manner such as by eliminating one of the switches, or one of the switches may be in circuit with the operational line of a burner while the other switch may be in circuit with the motor of the pump for circulating the heated water.

While the preferred form of the invention has been illustrated and described herein, it is to be understood that the invention is not so limited and the same covers and includes all modifications and forms thereof which fall within the scope of the invention.

What is claimed is:

1. In a thermostat, a casing including a base and a metallic shell of parabolic formation in cross-section secured to said base, a thermostatic element, means securing said thermostatic element to said casing to extend through the focal point of the shell for receiving radiant rays focused thereon by the parabolic formation of the shell, an electric switch, means carried by said casing securing said switch in operative position, electrical conductors connecting said switch in an electric circuit, a lever, means carried by said casing supporting said lever intermediate said thermostatic element and said switch for operation of the switch by the expansion of said thermostatic element against said lever in response to the combined heating effect of the atmosphere surrounding said casing and the radiant rays on said shell upon said thermostatic element.

2. In a thermostat, a casing including a base and a thin metallic shell secured to said base, said metallic shell being of parabolic formation in cross-section and having a blackened surface for absorbing radiant rays striking thereagainst, a thermostatic element, means securing said thermostatic element in operative position therein to extend through the focal point of the shell for receiving radiant rays focused thereon by the parabolic formation of the shell, an electric switch, means carried by said casing securing said switch in operative position therein, said switch being connected in an electric circuit extending through said casing, a spring tensioned lever, means supporting said lever within said casing between said thermostatic element and said switch for actuation of the said switch to make and break the circuit by movement of the thermostatic element in one direction against said lever and the release of the lever by the movement of the thermostatic element in the other direction in response to change of temperature within the casing due to the combined effect of the atmosphere surrounding the casing and the radiant rays on said shell upon said thermostatic element.

3. In a thermostat, a casing including a base and a metallic shell of parabolic formation secured to said base, a column secured at one end to said base and extending upwardly therefrom to the top of the shell, a thermostatic element, means securing said thermostatic element at one end to said column to extend through the focal point of the shell an electric switch, means securing said electric switch to said base within the casing, said switch being connected in an electric circuit extending through said casing, a lever, means supporting said lever on said column between said thermostatic element and said switch to actuate said switch by the movement of the thermostatic element against said lever in response to change of temperature within the casing.

4. In a thermostat, a casing including a base and a metallic shell secured to said base, a column secured at one end to said base, a thermostatic element, means carried by said column securing said thermostatic element within the casing with one end thereof being free for expansion and contraction, an electric switch, means securing said switch to said base, electrical conductors connecting said switch in an electric circut, a lever, means carried by said column pivotally supporting said lever for engagement with the free end of said thermostatic element to actuate said switch by the expansion and contraction of the thermostatic element to open and close said circuit in response to the effect of temperature conditions upon said shell.

5. In a thermostat, a casing including a base and a metallic shell of parabolic formation in cross-section secured to said base, a thermostatic element, means securing said thermostatic element to said casing to extend through the focal point of the shell for receiving radiant rays focused thereon by the parabolic formation of the shell, two electric switches arranged in side by side relation and set to be actuated successively, means carried by said casing securing said switches in operative position therein, electrical conductors connecting said switches respectively in electric circuits extending through said casing, a lever extending over both of said switches, means carried by said casing supporting said lever within said casing between said thermostatic element and said switches for operation of the switches by the movement of said thermostatic element against said lever in response to the combined heating effect of the atmosphere surrounding said casing and the radiant rays on said shell upon said thermostatic element, and means for adjusting one of said switches toward and away from said lever for engagement by said lever successively with the other switch.

6. In a thermostat, a casing including a base and a metallic shell mounted on the base, a column consisting of a plurality of legs affixed to the base to extend outwardly therefrom, a thermostatic element, means carried by said legs at the free outer ends thereof mounting said thermostatic element centrally within the casing with one end thereof being free for expansion and contraction, an electric switch affixed with reference to said base, a lever having openings through which said legs freely extend, means pivotally mounting said lever on said column between said thermostatic element and said switch for engagement of the free end of the thermostatic element with said lever to actuate the switch by the expansion and contraction of the thermostatic element in response to the effect of temperature conditions upon the shell.

7. In a thermostat, a casing including a base and a metallic shell mounted on the base, a column consisting of three legs arranged in triangular formation and affixed to the base to extend outwardly therefrom, a thermostatic element, means carried by said legs at the free outer ends thereof mounting said thermostatic element centrally within the casing with one end thereof being free for expansion and contraction, an electric switch affixed with reference to said base, a lever having three openings through which the legs freely extend, means pivotally mounting said lever on said column between said thermostatic element and said switch for engagement of the free end of the thermostatic element with said lever to actuate the switch by the expansion and contraction of the thermostatic element in response to the effect of temperature conditions upon the shell.

References Cited in the file of this patent

UNITED STATES PATENTS

| | | |
|---|---|---|
| 1,865,219 | Spencer | June 28, 1932 |
| 2,075,669 | Smith et al. | Mar. 30, 1937 |
| 2,146,604 | Taylor | Feb. 7, 1939 |
| 2,259,758 | Luce | Oct. 21, 1941 |
| 2,493,456 | Kaser | Jan. 3, 1950 |
| 2,498,864 | Root | Feb. 28, 1950 |
| 2,583,547 | Cox | Jan. 29, 1952 |
| 2,598,081 | Sway | May 27, 1952 |